(12) United States Patent
Fujisaki et al.

(10) Patent No.: US 10,305,344 B2
(45) Date of Patent: May 28, 2019

(54) DRIVE DEVICE

(71) Applicant: DENSO CORPORATION, Kariya (JP)

(72) Inventors: Katsuya Fujisaki, Kariya (JP); Koji Isogai, Kariya (JP); Hiroki Tomizawa, Kariya (JP); Makoto Taniguchi, Kariya (JP); Masahiro Goto, Kosai (JP)

(73) Assignee: DENSO CORPORATION, Kariya (JP)

( * ) Notice: Subject to any disclaimer, the term of this patent is extended or adjusted under 35 U.S.C. 154(b) by 217 days.

(21) Appl. No.: 15/281,536

(22) Filed: Sep. 30, 2016

(65) Prior Publication Data

US 2017/0104383 A1    Apr. 13, 2017

(30) Foreign Application Priority Data

Oct. 8, 2015    (JP) ................................ 2015-200068

(51) Int. Cl.
| | |
|---|---|
| *H02K 5/15* | (2006.01) |
| *H02K 5/16* | (2006.01) |
| *H02K 7/08* | (2006.01) |
| *F16C 25/06* | (2006.01) |
| *H02K 5/124* | (2006.01) |
| *B62D 5/04* | (2006.01) |
| *F16C 25/08* | (2006.01) |
| *H02K 5/173* | (2006.01) |
| *F16H 1/00* | (2006.01) |

(Continued)

(52) U.S. Cl.
CPC .......... H02K 5/124 (2013.01); B62D 5/0403 (2013.01); B62D 5/0424 (2013.01); B62D 5/0448 (2013.01); F16C 25/083 (2013.01); *F16H 1/00* (2013.01); *H02K 5/16* (2013.01); *H02K 5/1732* (2013.01); *H02K 7/083* (2013.01); *H02K 7/116* (2013.01)

(58) Field of Classification Search
CPC ............ H02K 5/124; H02K 5/00; H02K 5/15; H02K 5/16; H02K 5/163; H02K 5/173; H02K 5/1732; H02K 7/083; H02K 7/08; F16C 25/083; F16C 25/08; F16C 25/06
See application file for complete search history.

(56) References Cited

U.S. PATENT DOCUMENTS 3,934,311 A * 1/1976 Thompson ........... A47G 21/067
                                                       277/563
6,172,436 B1 * 1/2001 Subler ................. F16C 33/6662
                                                       29/898.11

(Continued)

FOREIGN PATENT DOCUMENTS

| GB | 1491182 A | 11/1977 |
|---|---|---|
| JP | 09065604 A * | 3/1997 |

(Continued)

*Primary Examiner* — Edgardo San Martin

(57) ABSTRACT

A drive device includes a shaft rotatably supported by a first bearing and a second bearing. The first bearing is disposed in a shaft hole of an output frame end. The second bearing is disposed in a bearing box of an opposite-to-output frame end. An oil seal is fixed in the shaft hole and is closer to an output end than the first bearing is, and is in sliding contact with an outer circumference of the shaft. A biasing member is housed in the bearing box and biases an outer race of the second bearing toward the output end. Accordingly, a deflection amount and a bend amount of the shaft at the location where the oil seal is disposed may be reduced.

7 Claims, 5 Drawing Sheets

(51) Int. Cl.
*H02K 5/00* (2006.01)
*H02K 7/00* (2006.01)
*F16C 25/00* (2006.01)
*H02K 7/116* (2006.01)

(56) References Cited

U.S. PATENT DOCUMENTS

| | | | | |
|---|---|---|---|---|
| 6,388,351 | B1* | 5/2002 | Fisher | H02K 5/1732 |
| | | | | 310/90 |
| 6,713,915 | B2* | 3/2004 | Takahashi | H02K 5/1732 |
| | | | | 310/254.1 |
| 9,054,563 | B2* | 6/2015 | Matsunaga | B62D 5/0403 |
| 2004/0140723 | A1* | 7/2004 | Severien | H02K 5/10 |
| | | | | 310/90 |
| 2005/0116557 | A1* | 6/2005 | Rojo Lulic | F16C 19/54 |
| | | | | 310/67 R |
| 2005/0168085 | A1* | 8/2005 | Ihata | H02K 5/1732 |
| | | | | 310/90 |
| 2006/0082234 | A1* | 4/2006 | Tsukamoto | F04B 17/03 |
| | | | | 310/90 |
| 2007/0251793 | A1 | 11/2007 | Swensgard et al. | |
| 2009/0309447 | A1* | 12/2009 | Leiber | H02K 1/27 |
| | | | | 310/156.12 |
| 2013/0140964 | A1 | 6/2013 | Matsunaga et al. | |
| 2015/0217797 | A1* | 8/2015 | Sin | B62D 5/0403 |
| | | | | 180/444 |
| 2016/0013697 | A1* | 1/2016 | Haga | H02K 5/04 |
| | | | | 310/71 |
| 2017/0066471 | A1* | 3/2017 | Tomizawa | B62D 5/0424 |
| 2017/0187262 | A1* | 6/2017 | Kai | H02K 7/083 |

FOREIGN PATENT DOCUMENTS

| | | | | |
|---|---|---|---|---|
| JP | 2002345211 A | * | 11/2002 | H02K 5/10 |
| JP | 2002-359945 A | | 12/2002 | |
| JP | 2002359945 A | * | 12/2002 | |
| JP | 2006-174581 A | | 6/2006 | |
| JP | 2007046653 A | * | 2/2007 | F16H 57/0469 |
| JP | 2008271747 A | * | 11/2008 | F16C 25/083 |
| JP | 2015093512 A | * | 5/2015 | |

* cited by examiner

DRIVE DEVICE

CROSS REFERENCE TO RELATED APPLICATION

The present application is based on Japanese Patent Application No. 2015-200068 filed on Oct. 8, 2015, disclosure of which is incorporated herein by reference.

TECHNICAL FIELD

The present disclosure relates to a drive device used in an electric power steering system.

BACKGROUND

Conventionally, electric power steering systems, which assist the steering of a driver using the torque of a motor, are known.

SUMMARY

A motor described in US 2007/0251793 A1 includes an oil seal disposed between a bearing and a gear. The bearing is disposed on an output end of a shaft which rotates together with a rotor. The gear is fixed to the output end of the shaft.

Here, an axial runout exists in the shaft as a design parameter of the motor, which includes the oil seal at the output end of the shaft. if the axial runout of the shaft is large, there is a concern that a fitting margin between a lip portion of the oil seal and the outer circumference of the shaft may deteriorate, or that the watertight property of the oil seal may deteriorate due to excess deformation of the lip portion, leading to loss of watertight property.

The motor described in US 2007/0251793 A1 includes a spring disposed on the output end of the shaft, and this spring biases the shaft in an opposite direction from the output end. For this reason, the motor is configured such that axial runout is caused in the shaft with a fulcrum being at a bearing disposed on an opposite side from the output end. Accordingly, in this motor, a distance between the bearing on the output end of the shaft and the bearing on the opposite side from the output end of the shaft is increased, thereby reducing axial runout in the shaft.

However, if the motor described in US 2007/0251793 A1 is used in an electric power steering system, there may be insufficient space in the axial direction of the motor due to, e.g., vehicular mounting restrictions. In this case, the distance between the bearing on the output end of the shaft and the bearing on the opposite side from the output end of the shaft may be decreased, and there is a concern that the axial runout in the shaft may increase as a result. Accordingly, there is a concern that it may be difficult to dispose a watertight oil seal in the motor.

In addition, a motor which is used in an electric power steering system may be mounted to a rack housing that houses a rack shaft of the vehicle. In this case, if the waterproofing of the rack housing fails, liquids such as water may enter into the rack housing. Then, assuming that the waterproofing of the oil seal in the motor has deteriorated, there is a concern the liquids (e.g., water) accumulated inside the rack housing may enter through the bearing supporting the output end of the shaft, and enter into the motor housing. In this case, the motor may seize up due to rust forming therein, or an electrical short may occur. Further, if the electric circuits controlling the energization of the motor are submerged in water, a variety of problems may occur, such as the electric power steering system being interrupted.

In view of the above, it is an object of the present disclosure to provide a drive device that may prevent the intrusion of liquids such as water.

According to an aspect of the present disclosure, a drive device for use in an electric power steering system comprises a stator having an annular shape, a rotor rotatably disposed radially inside the stator, a shaft fixed to the rotor to rotate together with the rotor, the shaft including an output end toward one side in an axial direction, an output frame end disposed toward the output end, the output frame end including a shaft hole, the shaft being inserted through the shaft hole, an opposite-to-output frame end disposed on an opposite side from the output end of the shaft, the opposite-to-output frame end including a bearing box, a first bearing disposed inside the shaft hole of the output frame end, the first bearing rotatably supporting the shaft, a second bearing disposed inside the bearing box of the opposite-to-output frame end, the second bearing rotatably supporting the shaft, a seal member fixed inside the shaft hole, the seal member being closer toward the output end than the first bearing is to the output end, the seal member being in sliding contact with an outer circumference of the shaft, and a biasing member housed in the bearing box, the biasing member biasing an outer race of the second bearing toward the output end.

Accordingly, when a force in the radial direction is applied to the output end of the shaft, the shaft deflects about a fulcrum at the center position of the first bearing. The distance between the seal member and the fulcrum at the first bearing is reduced in the drive device. Accordingly, it is possible to reduce the deflection amount and the bend amount of the shaft at the location where the seal member is disposed on the shaft. For this reason, it is possible to reduce deterioration in the interference fit of the seal member and reduce excess deformation and uneven wear in the seal member. Accordingly, the drive device may prevent water etc. entering from the output end through the seal member.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
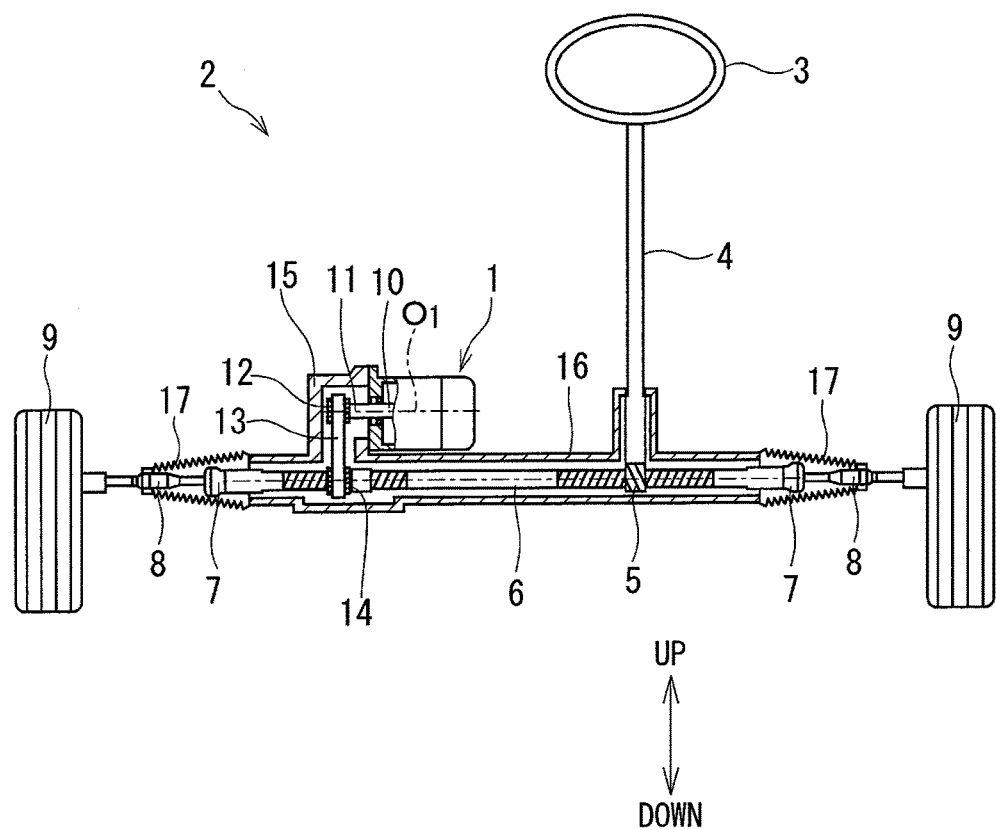
FIG. 1 is a schematic view of an electric power steering system including a drive device according to a first embodiment.

Next, a plurality of embodiments of the present disclosure will be explained with reference to the figures. In addition, in the plurality of embodiments, configurations which are substantially the same are denoted with the same reference numerals, and explanations thereof may be omitted for brevity.

First Embodiment

A first embodiment of the present disclosure will be explained with reference to FIGS. 1 to 4. A drive device 1 of the first embodiment is used in an electric power steering system 2 of a vehicle.

First, the electric power steering system 2 will be explained.

As shown in FIG. 1, when a driver operates a steering wheel 3, the resulting rotation motion is transmitted through a steering shaft 4 to a pinion gear 5. Then, the rotation motion is converted to linear motion by a rack shaft 6 engaged with the pinion gear 5. The two ends of the rack shaft 6 are connected to steered wheels 9 through ball joints 7 and tie rods 8.

When the driver steers the steering wheel 3, the drive device 1 outputs a torque for assisting the steering of the driver based on a torque applied by the driver on the steering shaft 4 and based on information of the vehicle such as vehicle speed. The drive device 1 includes a shaft 10, and a motor pulley 12 is fixed to an output end 11 of the shaft 10. The torque from the drive device 1 is transmitted from the motor pulley 12, through a belt 13, to a rack pulley 14 disposed on the rack shaft 6. A ball screw mechanism (not illustrated) is disposed within the rack pulley 14, and the torque of the rack pulley 14 is converted into linear motion by the ball screw mechanism. The steering angle of the steered wheels 9 is controlled according to a displacement amount of the rack shaft 6. Accordingly, the drive device 1 is able to assist the steering operation of the driver.

The above described motor pulley 12, belt 13, rack pulley 14, and ball screw mechanism are housed in a gear housing 15. The rack shaft 6 is housed within a substantially cylindrical rack housing 16. The space inside the rack housing 16 is in communication with the space inside the gear housing 15. Boots 17, which are formed of, e.g., rubber or resin with a bellows shape, are disposed on the two ends of the rack housing 16. The boots 17 retain grease and prevent outside sand, mud, water, etc. from entering into the rack housing 16 and the gear housing 15.

Next, the drive device 1 will be discussed.

Figure 2:
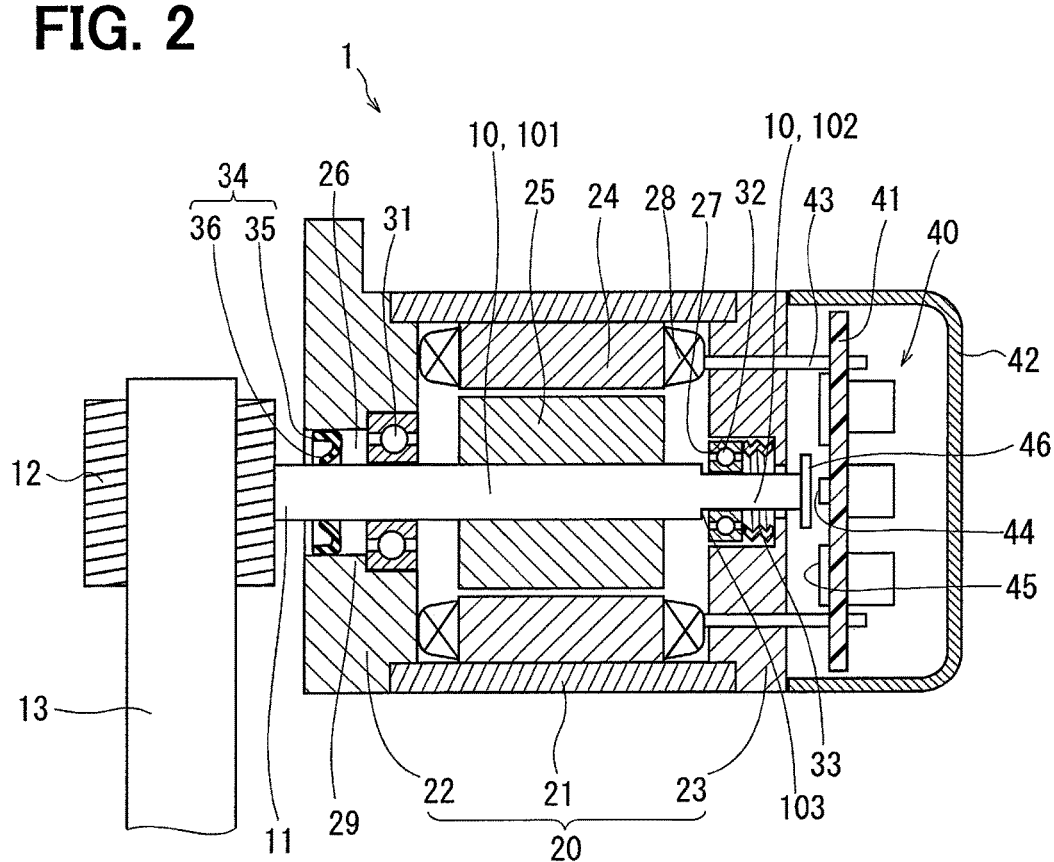
FIG. 2 is a cross sectional view of a drive device according to a first embodiment.

As shown in FIG. 2, the drive device 1 includes a housing 20, a stator 24, a rotor 25, a shaft 10, a first bearing 31, a second bearing 32, a biasing member 33, an oil seal 34 that acts as a seal member, and a control circuit unit 40.

The housing 20 includes a cylindrical case 21, an output frame end 22, and an opposite-to-output frame end 23. In addition, the case 21, the output frame end 22, and the opposite-to-output frame end 23 may be integrally formed, or may be configured as separate components.

The output frame end 22 is formed of, e.g., aluminum, and is substantially disc-shaped. The output frame end 22 is fixed to one end of the case 21 in an axial direction. The shaft 10 includes an output end 11 along the axial direction which is inserted through the output frame end 22. In addition, the output frame end 22 has formed therein a shaft hole 26. The first bearing 31 and the oil seal 34 are mounted in the shaft hole 26.

The opposite-to-output frame end 23 is also formed of, e.g., aluminum, and also is substantially disc-shaped. The opposite-to-output frame end 23 is fixed to the other end of the case 21 in the axial direction. The opposite-to-output frame end 23 includes a bearing box 27. The second bearing 32 and the biasing member 33 are mounted in the bearing box 27.

The stator 24 is an annular magnetic body, and is fixed to the inside of the case 21. A coil 28 is wound in a plurality of slots (not illustrated) disposed in the stator 24 along a circumferential direction. When the coil 28 is energized, the stator 24 generates a rotating magnetic field that causes the rotor 25 to rotate.

The rotor 25 is a cylindrical magnetic body, and is disposed radially inward of the stator 24. The rotor 25 is magnetized with opposing magnetic poles arranged alternately in the circumferential direction. The rotor 25 is rotatable with respect to the stator 24, and rotates forward and in reverse according to the rotating magnetic field generated by the stator 24.

The shaft 10 is fixed at the axial center of the rotor 25. The shaft 10 includes a large diameter portion 101 and a small diameter portion 102. The large diameter portion 101 includes the center portion of the shaft 10, which is fixed to the rotor 25, and spans to the output end 11. The small diameter portion 102 protrudes from the center portion of the shaft 10 in a direction away from the output end 11. The outer diameter of the small diameter portion 102 is smaller than the outer diameter of the large diameter portion 101.

The inner race of the first bearing 31 is fixed, by interference fit, with a section of the large diameter portion 101 of the shaft 10 that protrudes out from the rotor 25 toward the output end 11. The outer race of the first bearing 31 is fixed, by interference fit, with the inner wall of the shaft hole 26 in the output frame end 22. The first bearing 31 rotatably supports the shaft 10.

The output frame end 22 includes a stopper portion 29 that protrudes radially inward from the inner wall of the shaft hole 26 in a cylindrical shape. The stopper portion 29 is located between the output end 11 and the first bearing 31. The first bearing 31 is positioned by abutting against the stopper portion 29.

The inner race of the second bearing 32 is fixed, by interference fit, with the small diameter portion 102 of the shaft 10. Here, a step 103 is formed at the interface between the small diameter portion 102 and the large diameter portion 101 of the shaft 10. A fixed gap is disposed between the step 103 and the second bearing 32.

The outer race of the second bearing 32 is loosely fit, by clearance fit, inside the bearing box 27 of the opposite-to-output frame end 23. The second bearing 32 rotatably supports the shaft 10.

The outer diameter of the small diameter portion 102 of the shaft 10, which is fixed to the second bearing 32, is smaller than the outer diameter of the large diameter portion 101 of the shaft 10, which is fixed to the first bearing 31.

In other words, a portion of the shaft 10 fixed to the second bearing 32 has a smaller outer diameter than a portion of the shaft 10 fixed to the first bearing 31. Accordingly, the inner diameter of the second bearing 32 is reduced and, at the same time, the outer diameter of the second bearing 32 may be set to be smaller than the outer diameter of the first bearing 31. As a result, it is possible to reduce a gap $\delta 2$ (see FIG. 4) between the outer wall of the second bearing 32 and the inner wall of the bearing box 27 may be set to be small. Accordingly, it is possible to reduce a deflection amount $\delta 1$ in the shaft 10 of the drive device 1.

The biasing member 33 may be, for example, a multiple helical wave washer. The biasing member 33 is disposed in the bearing box 27 and is located further away from the output end 11 than the second bearing 32 is to the output end 11. The biasing member 33 biases the outer race of the second bearing 32 toward the output end 11.

Figure 3:
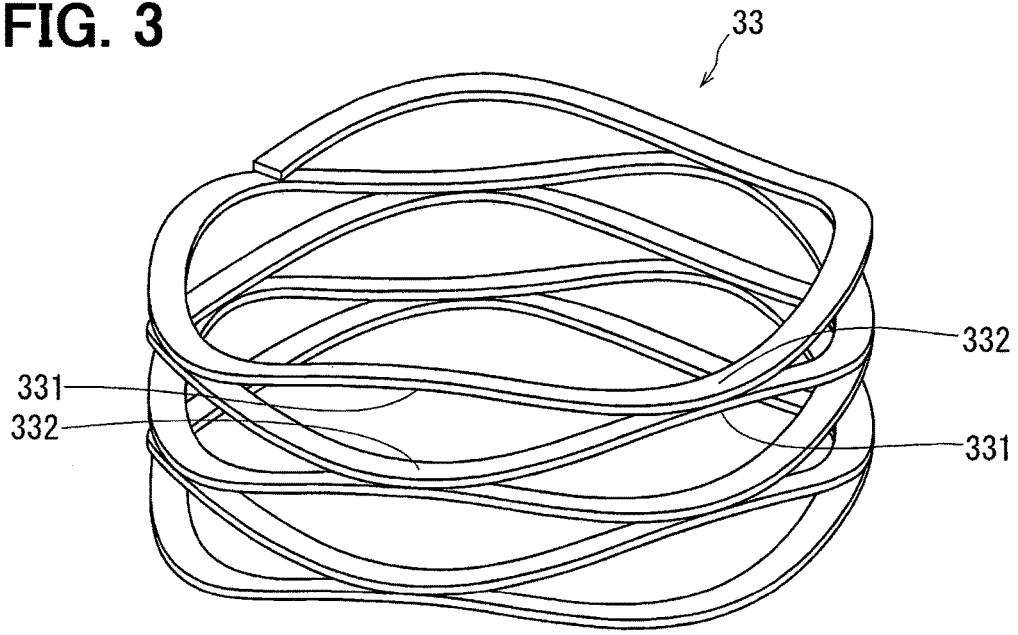
FIG. 3 is a perspective view of a spring member.

As shown in FIG. 3, a multiple helical wave washer used as the biasing member 33 is a flat wire formed in a wave shape along the thickness direction and being wound edgewise in a multiple-turn helical manner. In addition, the biasing member 33 is illustrated in an exemplary manner as having 4.5 turns. The biasing member 33 includes several portions which lie on of top of each other along the axial direction, and in these locations, the upper flat wire portions forms wavepeaks 331 and the lower flat wire portions form wavevalleys 332. The biasing member 33 is configured such that the wavepeaks 331 and the wavevalleys 332 face each other in the axial direction at the same locations along the circumferential direction.

The spring constant of the multiple helical wave washer may be set to be small by setting the spring load of each turn to be small. Further, the spring load of the entire plurality of windings may be set to be large by increasing the number of turns in the multiple helical wave washer, without increasing the physical size of the multiple helical wave washer in the radial direction. For this reason, by using a multiple helical wave washer as the biasing member 33, the outer diameter of the biasing member 33 may be reduced. As a result, the outer diameter of the second bearing 32 may also be reduced. In addition, even if the shaft 10 is significantly displaced in the axial direction, a relatively large spring load may be constantly applied by the biasing member 33 on the outer race of the second bearing 32.

As shown in FIG. 2, the oil seal 34 is fixed to the inner wall of the shaft hole 26. The oil seal 34 is located between the output end 11 and the stopper portion 29 abutting the first bearing 31. The oil seal 34 includes a cylindrical seal body 35 and a lip 36 that extends radially inward from the seal body 35. The seal body 35 is formed in a cylindrical shape, and the outer circumference of the seal body 35 is fixed by pressing fitting to the inner wall of the shaft hole 26. The lip 36 extends radially inward from the inner wall of the seal body 35 in an annular shape, and is in sliding contact with the outer circumference of the shaft 10. When the oil seal 34 is removed from the shaft 10, the inner diameter of the lip 36 is smaller than the outer diameter of the shaft 10. In other words, the lip 36 is designed with a fixed interference with the outer circumference of the shaft 10. When the shaft 10 is rotating, the oil seal 34 works to discharge a small amount of oil at a time from inside of the housing 20 to outside of the housing 20, thereby preventing outside water etc. from entering the housing 20.

The control circuit unit 40 is disposed on a side of the opposite-to-output frame end 23 facing away from the output end 11, and controls the energization of the coil 28 wound on the stator 24. The control circuit unit 40 includes a substrate 41 and a cover 42. A control circuit formed on the substrate 41 is electrically connected to a wire terminal 43 that protrudes out from the coil 28. The control circuit includes a rotation angle sensor 44, a microprocessor 45, and an inverter circuit (not illustrated). The rotation angle sensor 44 detects a magnetic field of a magnet 46 disposed on an end portion of the shaft 10, and transmits that signal to the microprocessor 45. The microprocessor 45 detects the rotation angle of the shaft 10 using the signal from the rotation angle sensor 44, and controls the operation of the inverter circuit. When the coil 28 is energized by the inverter circuit through the wire terminal 43, the stator 24 generates a rotating magnetic field that causes the stator 25 to rotate. As a result, the rotor 25 rotates along with the shaft 10. Accordingly, the torque output by the drive device 1 is transmitted to the rack shaft 6 through the motor pulley 12f disposed on the output end 11 of the shaft 10, the belt 13, etc.

The motor pulley 12 includes teeth that mesh with the belt 13. Accordingly, when the shaft 10 rotates, the motor pulley 12 applies an axial load to the shaft 10. The direction of this load changes between either side along the axial direction of the shaft 10 in accordance with the rotation direction of the shaft 10.

Further, when the shaft 10 rotates, the shaft 10 is drawn by a force toward the rack pulley 14 due to the rotation of the belt 13 wrapped around the motor pulley 12. The magnitude of this force changes according to the magnitude of the torque of the shaft 10, the vibrations of the rack pulley 14, etc.

Accordingly, a force causes the shaft 10 to deflect and a force that causes the shaft 10 to bend are applied to the drive device 1 used in the electric power steering system 2.

In this regard, a deflection amount and a bend amount of the shaft 10 is considered for the drive device 1 of the present embodiment and a drive device 50 of a comparative example.

Figure 5:
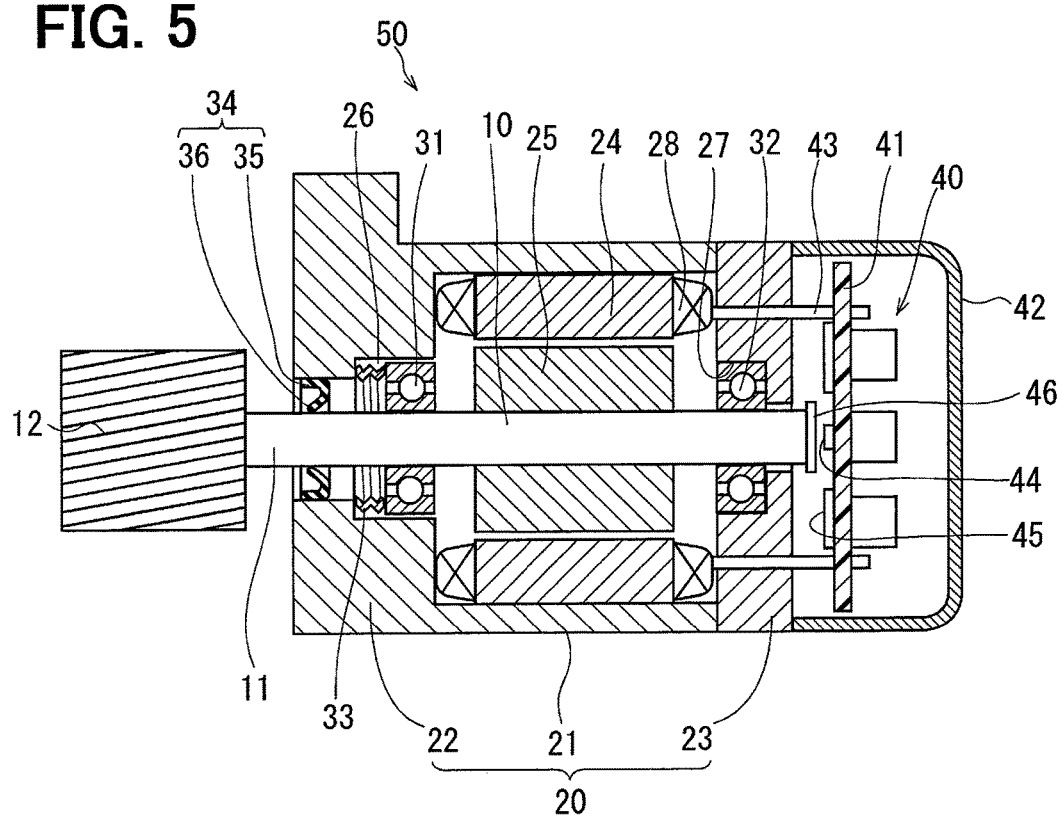
FIG. 5 is a cross sectional view of a comparative example.

As shown in FIG. 5, the drive device 50 of the comparative example is configured such that the first bearing 31, which is fixed near the output end 11 of the shaft 10, is disposed with a clearance fit inside the shaft hole 26. In addition, the second bearing 32, which is fixed away from the output end 11 of the shaft 10, is fixed by interference fit with the inner wall of the bearing box 27. The biasing member 33 of the drive device 50 of the comparative example biases the outer race of the first bearing 31 toward the second bearing 32.

Figure 4:
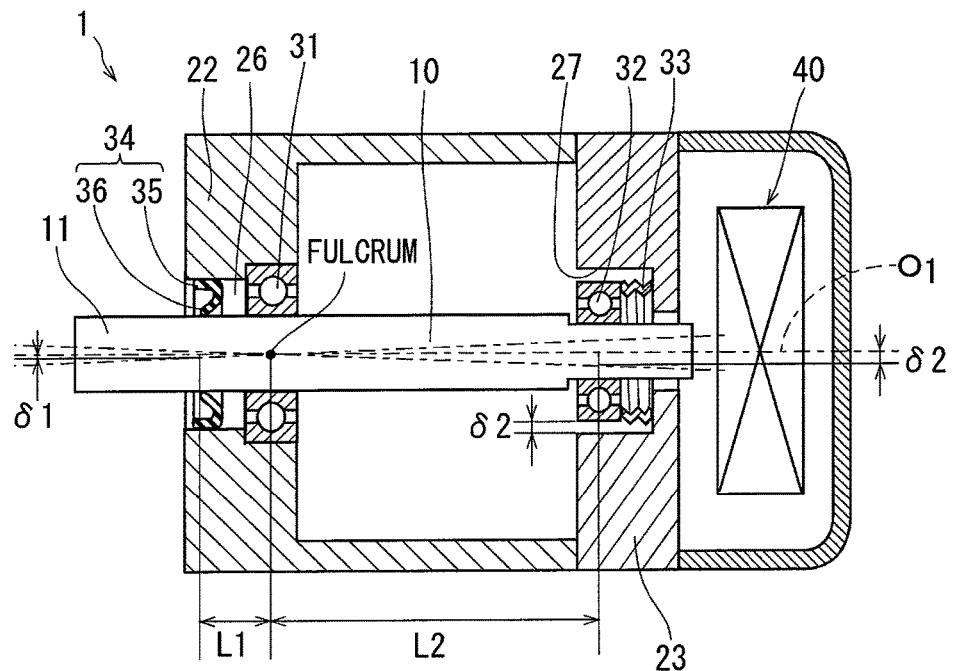
FIG. 4 is a schematic view of a drive device according to a first embodiment.
Figure 6:
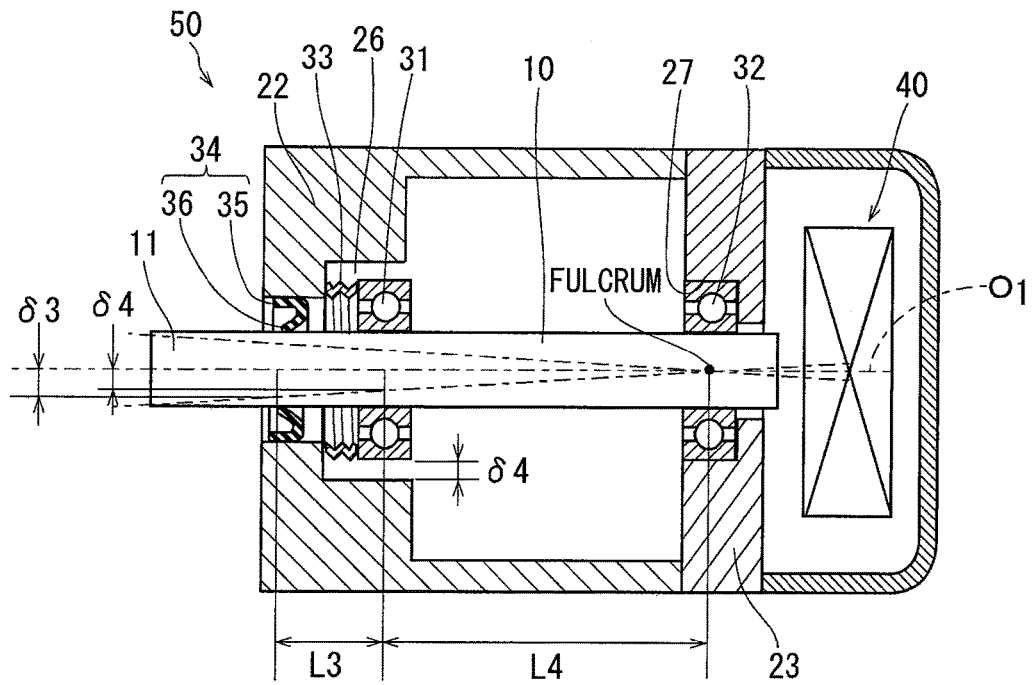
FIG. 6 is a schematic view of a comparative example.

FIG. 6 shows a schematic view of the drive device 50 of the comparative example, while FIG. 4 shows a schematic view of the drive device 1 of the first embodiment. In addition, in FIGS. 4 and 6, the gap created by the clearance fit at the outer race of the first bearing 31 or the second bearing 32 is schematically enlarged for this explanation. In actuality, only a slight gap exists.

As shown in FIG. 4, according to the first embodiment, the outer race of the first bearing 31 is fixed by interference fit with the inner wall of the shaft hole 26. As a result, the shaft 10 deflects about a fulcrum at the center position of the first bearing 31. According to the first embodiment, δ1 is defined as the maximum deflection width at one end of the shaft 10 located at where the lip 36 of the oil seal 34 abuts the shaft 10. Further, δ2 is defined as the gap between the outer race of the second bearing 32 and the inner wall of the bearing box 27. In addition, L1 is the distance between the first bearing 31 and the lip 36 of the oil seal 34, while L2 is the distance between the first bearing 31 and the second bearing 32.

In this case, the following equation (1) applies:

$$\delta 1 = \delta 2 \times L1/L2 \qquad (1)$$

Conversely, according to the comparative example as shown in FIG. 6, the outer race of the second bearing 32 is fixed by interference fit with the inner wall of the bearing box 27. As a result, the shaft 10 deflects about a fulcrum at the center position of the second bearing 32. According to the comparative example, δ3 is defined as a maximum deflection width at one end of the shaft 10 located at where the lip 36 of the oil seal 34 abuts the shaft 10, and δ4 is defined as the gap between the outer race of the second bearing 32 and the inner wall of the bearing box 27. Further, L3 is the distance between the first bearing 31 and the lip 36 of the oil seal 34, while L4 is the distance between the first bearing 31 and the second bearing 32.

In this case, the following equation (2) applies:

$$\delta 3 = \delta 4 \times (L3+L4)/L4 \quad (2)$$

Then, equation (2) may be transformed into the following equation (3):

$$\delta 3 = (\delta 4 \times L3/L4) + \delta 4 \quad (3)$$

The ($\delta 4 \times L3/L4$) term on the right side of equation (3) above corresponds to the ($\delta 2 \times L1/L2$) term on the right side of equation (1). Accordingly, when comparing equation (1) with equation (3), the maximum deflection width $\delta 1$ of the shaft 10 of the first embodiment is smaller than the maximum deflection width $\delta 3$ of the shaft 10 of the comparative example. Again, these maximum deflection widths are measured at where the lip 36 of the oil seal 34 contacts the shaft 10.

In addition, according to the first embodiment, the biasing member 33 is not disposed between the oil seal 34 and the first bearing 31. Accordingly, the distance L1 from the first bearing 31 to the lip 36 of the oil seal 34 in the first embodiment is shorter than the distance L3 from the first bearing 31 to the lip 36 of the oil seal 34 in the comparative example. Accordingly, the shaft 10 of the first embodiment has a smaller amount of deflection at the location where the lip 36 of the oil seal 34 contacts the shaft 10 as compared to the shaft 10 of the comparative example. As a result, the drive device 1 of the first embodiment is able to reduce deterioration in the interference fit between the oil seal 34 and the outer circumference of the shaft 10, and is able to reduce excess deformation and uneven wear in the oil seal 34.

The drive device 1 of the first embodiment as described above exhibits at least the following effects.

(1) In the first embodiment, the first bearing 31 is disposed inside the shaft hole 26, and the second bearing 32 is disposed in the bearing box 27. The biasing member 33 biases the outer race of the second bearing 32 toward the output end 11. The oil seal 34 is fixed to the inner wall of the shaft hole 26, and is in sliding contact with the outer circumference of the shaft 10.

Due to this, when a force in the radial direction is applied to the output end 11 of the shaft 10, the shaft 10 deflects about a fulcrum at the center position of the first bearing 31. The distance L1 between the oil seal 34 and the fulcrum at the center position of the first bearing 31 is reduced in the drive device 1. Accordingly, it is possible to reduce the deflection amount $\delta 1$ and the bend amount of the shaft 10 at the location where the lip 36 of the oil seal 34 contacts the shaft 10. For this reason, it is possible to reduce deterioration in the interference fit of the oil seal 34 and reduce excess deformation and uneven wear in the oil seal 34. Accordingly, the drive device 1 may prevent water etc. entering from the output end 11 through the oil seal 34.

(2) In the first embodiment, the outer diameter of the second bearing 32 is smaller than the outer diameter of the first bearing 31.

Since the outer diameter of the second bearing 32 is reduced, it is possible to set a small gap $\delta 2$ between the outer race of the second bearing 32 and the inner wall of the bearing box 27. Accordingly, the drive device 1 may reduce the deflection amount $\delta 1$ of the shaft 10.

(3) In the first embodiment, the second bearing 32 is fixed to the small diameter portion 102 of the shaft 10, and the first bearing 31 is fixed to the large diameter portion 101 of the shaft 10. The outer diameter of the small diameter portion 102 is smaller than the outer diameter of the large diameter portion 101.

Accordingly, the inner diameter of the second bearing 32 may be reduced, and the outer diameter of the second bearing 32 may be reduced. Thus, it is possible to reduce the gap $\delta 2$ between the outer race of the second bearing 32 and the inner wall of the bearing box 27.

(4) In the first embodiment, the output frame end 22 includes the stopper portion 29 between the first bearing 31 and the oil seal 34. The stopper portion 29 protrudes radially inward from the inner wall of the shaft hole 26.

Accordingly, due to the stopper portion 29, the drive device 1 may prevent the first bearing 31 from slipping out toward the output end 11.

(5) In the first embodiment, the biasing member 33 is a multiple helical wave washer.

By using a multiple helical wave washer as the biasing member 33, the outer diameter of the biasing member 33 may be reduced. Accordingly, it is possible to use a second bearing 32 with a small outer diameter as well. Further, by using a multiple helical wave washer, even if there are variations in axial load due to, e.g., variations in tolerances, a relatively large spring load may be continuously applied to the second bearing 32.

Second Embodiment

Figure 7:
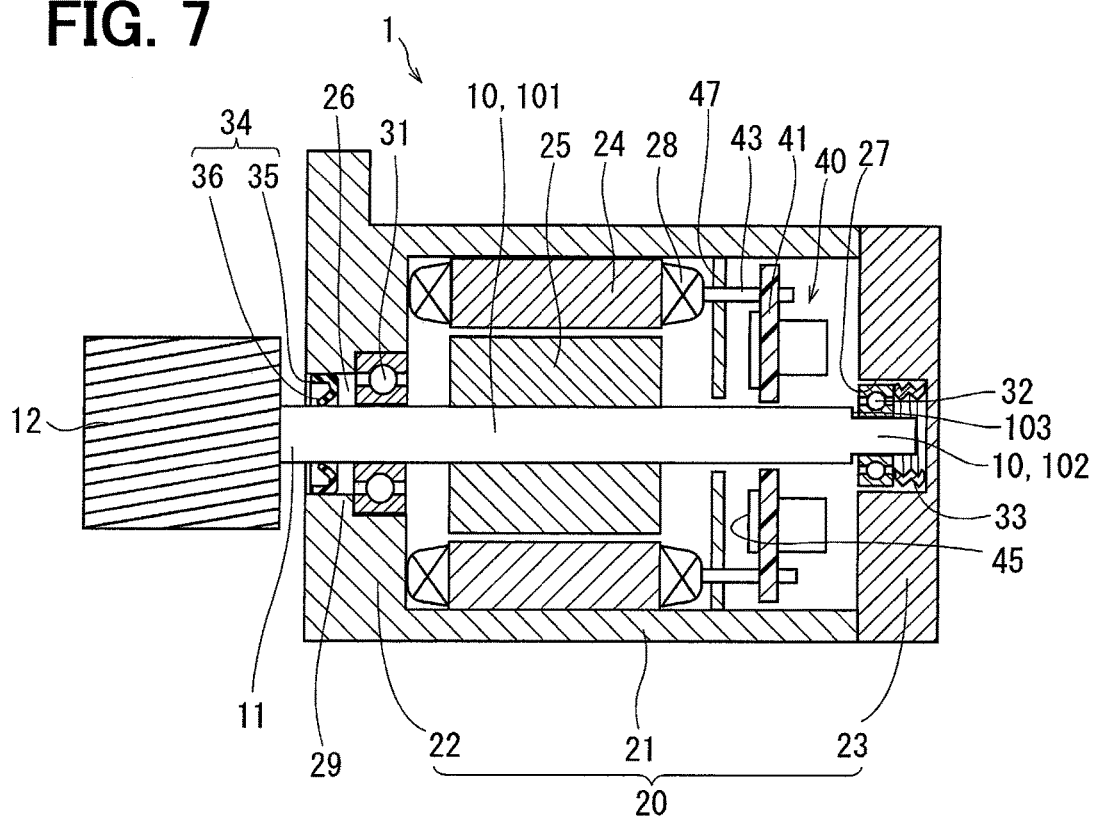
FIG. 7 is a cross sectional view of a drive device according to a second embodiment.

A second embodiment of the present disclosure is shown in FIG. 7. According to the drive device 1 of the second embodiment, the control circuit unit 40 is interposed between the opposite-to-output frame end 23 and the stator 24/rotor 25. The second bearing 32 and the biasing member 33 are disposed in the bearing box 27 of the opposite-to-output frame end 23. The control circuit unit 40 is disposed between the first bearing 31 and the second bearing 32. More specifically, the control circuit unit 40 is disposed closer toward the second bearing 32 and than the stator 24 and the rotor 25 are to the second bearing 32.

Further, in the housing 20, a partitioning member 47 is disposed between the control circuit unit 40 and the stator 24/rotor 25. The partitioning member 47 extends radially inward from the inner wall of the housing 20.

In the second embodiment as well, the outer race of the second bearing 32 is disposed inside the bearing box 27 with a clearance fit. Conversely, the outer race of the first bearing 31 is fixed in the shaft hole 26 with an interference fit. For this reason, in the second embodiment as well, the shaft 10 deflects about a fulcrum at the center position of the first bearing 31. Accordingly, the maximum deflection width $\delta 1$ of the shaft 10 located at where the lip 36 of the oil seal 34 abuts the shaft 10 is represented by equation (1) of the first embodiment. In the second embodiment, the distance L2 between the first bearing 31 and the second bearing 32 may be increased as compared to the distance L2 of the first embodiment. Accordingly, the drive device 1 may further reduce the deflection amount $\delta 1$ and the bend amount of the shaft 10.

Third Embodiment

Figure 8:
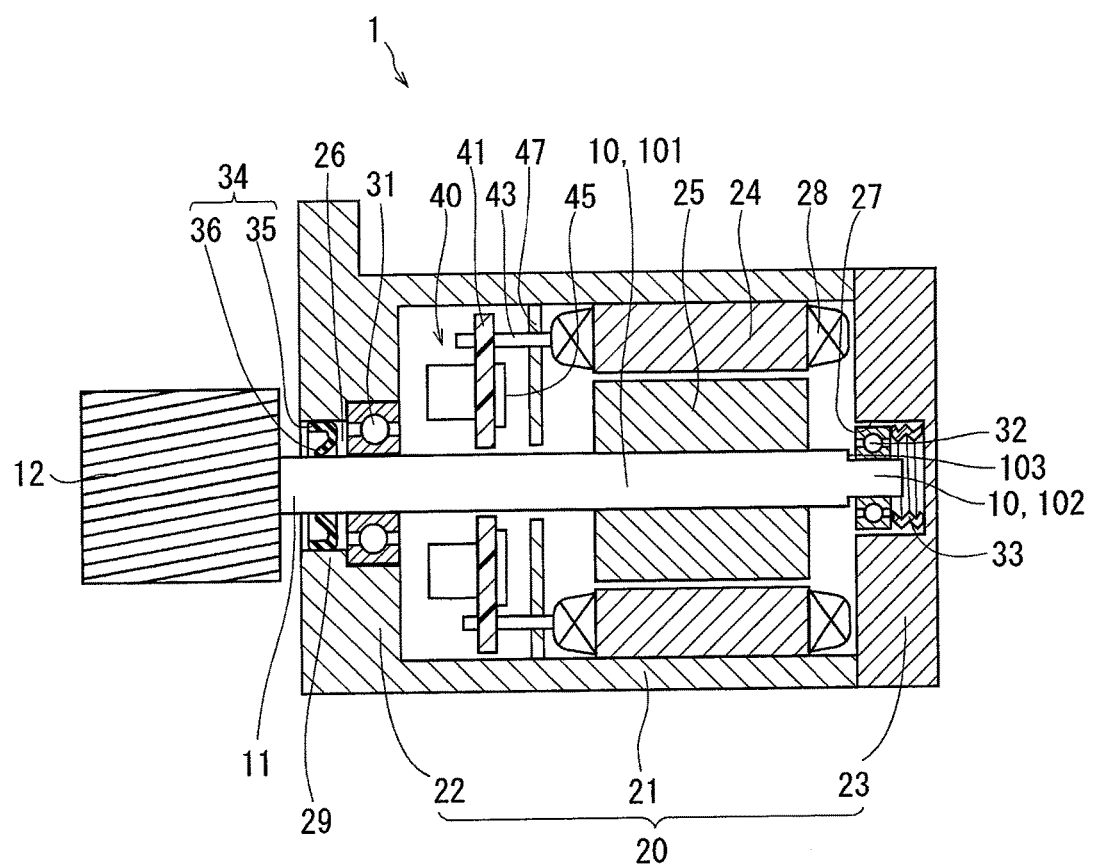
FIG. 8 is a cross sectional view of a drive device according to a third embodiment.

A third embodiment of the present disclosure is shown in FIG. 8. In the third embodiment as well, the control circuit unit 40 is disposed between the first bearing 31 and the second bearing 32. More specifically, the control circuit unit 40 is disposed between the first bearing 31 and the stator 24/rotor 25.

In the third embodiment as well, the outer race of the second bearing 32 is disposed inside the bearing box 27 with a clearance fit. Conversely, the outer race of the first bearing 31 is fixed in the shaft hole 26 with an interference fit. For this reason, in the third embodiment as well, the shaft 10 deflects about a fulcrum at the center position of the first bearing 31. In the third embodiment as well, the distance L2 between the first bearing 31 and the second bearing 32 may be increased as compared to the distance L2 of the first embodiment. Accordingly, the drive device 1 may further reduce the deflection amount δ1 and the bend amount of the shaft 10.

Other Embodiments (1) According to the above embodiments, the drive device transmits torque to the rack shaft 6 of the vehicle through belts. However, in other embodiments, the drive device 1 may be a dual pinion type, or a rack mounted pinion type power steering system (i.e., as opposed to being belt driven).

(1) In the above embodiments, the drive device 1 transmits torque to the rack shaft 6 of the vehicle in the electric power steering system 2. However, in other embodiments, the drive device 1 may provide steering assist to the drive by transmitting torque to the column shaft of the vehicle.

(3) In the above embodiments, the motor unit of drive device 1 is a brushless motor. However, in other embodiments, the motor unit of the drive device 1 may be a brushed type motor where a coil is wound about the rotor.

(4) In the above embodiments, the biasing member 33 is a multiple helical wave washer. However, in other embodiments, the biasing member 33 may be a dish washer, a wave spring, a coil spring, rubber, etc.

Accordingly, the present disclosure is not limited to the above described embodiments, and in addition to the combination of a plurality of embodiments, a variety of other modifications which do not depart from the gist of the present disclosure are contemplated.

The invention claimed is:

1. A drive device for use in an electric power steering system, comprising:
a stator having an annular shape;
a rotor rotatably disposed radially inside the stator;
a shaft fixed to the rotor to rotate together with the rotor, the shaft including an output end toward one side in an axial direction;
an output frame end disposed toward the output end, the output frame end including a shaft hole, the shaft being inserted through the shaft hole;
an opposite-to-output frame end disposed on an opposite side from the output end of the shaft, the opposite-to-output frame end including a bearing box;
a first bearing disposed inside the shaft hole of the output frame end, the first bearing rotatably supporting the shaft;
a second bearing disposed inside the bearing box of the opposite-to-output frame end, the second bearing rotatably supporting the shaft;
a seal member fixed inside the shaft hole, the seal member being closer toward the output end than the first bearing is to the output end, the seal member being in sliding contact with an outer circumference of the shaft; and
a biasing member housed in the bearing box, the biasing member biasing an outer race of the second bearing toward the output end, wherein
the first bearing is fixed inside the shaft hole of the output frame end with an interference fit, and
the second bearing is disposed in the bearing box of the opposite-to-output frame end with a clearance fit.

2. The drive device of claim 1, wherein
an outer diameter of the second bearing is smaller than an outer diameter of the first bearing.

3. The drive device of claim 1, wherein
a portion of the shaft fixed to the second bearing has a smaller outer diameter than a portion of the shaft fixed to the first bearing.

4. The drive device of claim 1, wherein
the output frame end includes a stopper portion between the first bearing and the seal member, the stopper portion protruding radially inward from an inner wall of the shaft hole.

5. The drive device of claim 1, further comprising:
a control circuit unit that controls energizing of a coil wound about the stator or the rotor, wherein
the control circuit unit is disposed between the first bearing and the second bearing.

6. The drive device of claim 5, wherein
the control circuit unit is disposed closer toward the second bearing than the stator and the rotor are to the second bearing, and
the second bearing is disposed on an opposite side from the stator and the rotor with respect to the control circuit unit.

7. The drive device of claim 1, wherein
the biasing member is a multiple helical wave washer.

* * * * *